(12) United States Patent
Chen et al.

(10) Patent No.: US 11,549,796 B2
(45) Date of Patent: Jan. 10, 2023

(54) THICKNESS MEASURING DEVICE (71) Applicant: Teco Image Systems Co., Ltd., Taipei (TW)

(72) Inventors: Chien-Ying Chen, Taipei (TW); Yu-Jen Chang, Taipei (TW); Ken-Te Chou, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 278 days.

(21) Appl. No.: 17/096,585

(22) Filed: Nov. 12, 2020

(65) Prior Publication Data

US 2022/0113123 A1    Apr. 14, 2022

(30) Foreign Application Priority Data

Oct. 12, 2020 (TW) ................................ 109135236

(51) Int. Cl.
*G01B 7/06* (2006.01)
*G01B 7/00* (2006.01)
*G01B 9/02* (2022.01)

(52) U.S. Cl.
CPC ............. *G01B 7/001* (2013.01); *G01B 7/002* (2013.01); *G01B 7/08* (2013.01); *G01B 9/02049* (2013.01)

(58) Field of Classification Search
CPC .......... G01B 7/001; G01B 7/002; G01B 7/08; G01B 9/02049
See application file for complete search history.

(56) References Cited

U.S. PATENT DOCUMENTS

| | | | | |
|---|---|---|---|---|
| 3,922,791 | A | * | 12/1975 | Maxey, Sr. ............ G01B 7/012 33/832 |
| 2004/0177520 | A1 | * | 9/2004 | Nakamura ........... G03F 7/70058 33/1 M |
| 2018/0245851 | A1 | * | 8/2018 | Björklund ............. C21C 5/4673 |
| 2019/0383593 | A1 | * | 12/2019 | Martelli ................. G01B 7/001 |
| 2020/0208962 | A1 | * | 7/2020 | Kimura .................. G01B 11/06 |
| 2021/0178452 | A1 | * | 6/2021 | Hörtrich ................. B21F 1/004 |

* cited by examiner

*Primary Examiner* — Jeff W Natalini
(74) *Attorney, Agent, or Firm* — Kirton McConkie; Evan R. Witt (57) ABSTRACT

The present disclosure provides a thickness measuring device including a base, a first moving component, a second moving component, a frame and a linking component. The base includes a base main body and a sensor. The first moving component moves along a first direction and includes a contacting end. The second moving component moves along a second direction and includes a sensing element corresponding to the sensor. The frame is connected to the base and includes a frame main body, a first guiding groove and a second guiding groove. The first and second guiding grooves are formed on the frame main body for accommodating the first and second moving components. The linking component includes a rotating element, a first connection portion and a second connection portion. The first and second connection portions are disposed on a surface of the rotating element and connected to the first and second moving components.

13 Claims, 8 Drawing Sheets

THICKNESS MEASURING DEVICE

FIELD OF THE INVENTION

The present disclosure relates to a thickness measuring device, and more particularly to a thickness measuring device capable of enlarging the displacement of the sensing element to improve the measurement accuracy.

BACKGROUND OF THE INVENTION

When the laminator performs the hot-pressing process, the thickness of the laminating film should be known so as to determine the parameters of the hot-pressing process. Generally, within a conventional thickness measuring device used for measuring the thickness of the laminating film, a fixed grating is directly connected to a detection rod. When the detection rod contacts the detected object, i.e., the laminating film, the thickness of the detected object can be obtained by sensing the displacement of the fixed grating with respect to the capacitance-grating sensor. In such structure of the conventional thickness measuring device, the measurement accuracy is directly determined by the precision of the components and the resolution of the sensor. When the measurement accuracy is needed to be improved, the requirements of the precision of the components and the resolution of the sensor are significantly increased. As a result, the cost of the thickness measuring device is raised.

Therefore, there is a need of providing a thickness measuring device so as to obviate the drawbacks encountered in the prior arts.

SUMMARY OF THE INVENTION

It is an object of the present disclosure to provide a thickness measuring device for addressing the drawbacks of the prior art.

It is another object of the present disclosure to provide a thickness measuring device. By the linking component connected between the first moving component and the second moving component, and by the difference between the distance between the first moving component and the rotating axis of the linking component and the distance between the second moving component and the rotating axis of the linking component, the displacement of the second moving component is enlarged as so to achieve the efficacy of amplifying the sensing signal to improve the measurement accuracy. In addition, by the structural design of the rotating element, the efficacy of reducing the manufacturing cost of the thickness measuring device is achieved.

In accordance with an aspect of the present disclosure, a thickness measuring device is provided. The thickness measuring device includes a base, a first moving component, a second moving component, a frame and a linking component. The base includes a base main body and a sensor. The sensor is disposed on a surface of the base main body. The first moving component is capable of moving along a first direction and includes a contacting end. The contacting end is configured to contact a detected object. The second moving component is capable of moving along a second direction and includes a sensing element. The sensing element is spatially corresponding to the sensor. The frame is connected to the base and includes a frame main body, a first guiding groove and a second guiding groove. The first guiding groove and the second guiding groove are formed on the frame main body. The first moving component is at least partially accommodated in the first guiding groove and is capable of moving in the first guiding groove. The second moving component is at least partially accommodated in the second guiding groove and is capable of moving in the second guiding groove. The linking component includes a rotating element, a first connection portion and a second connection portion. The first connection portion is disposed on a surface of the rotating element and is connected to the first moving component. The second connection portion is disposed on the surface of the rotating element and is connected to the second moving component.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
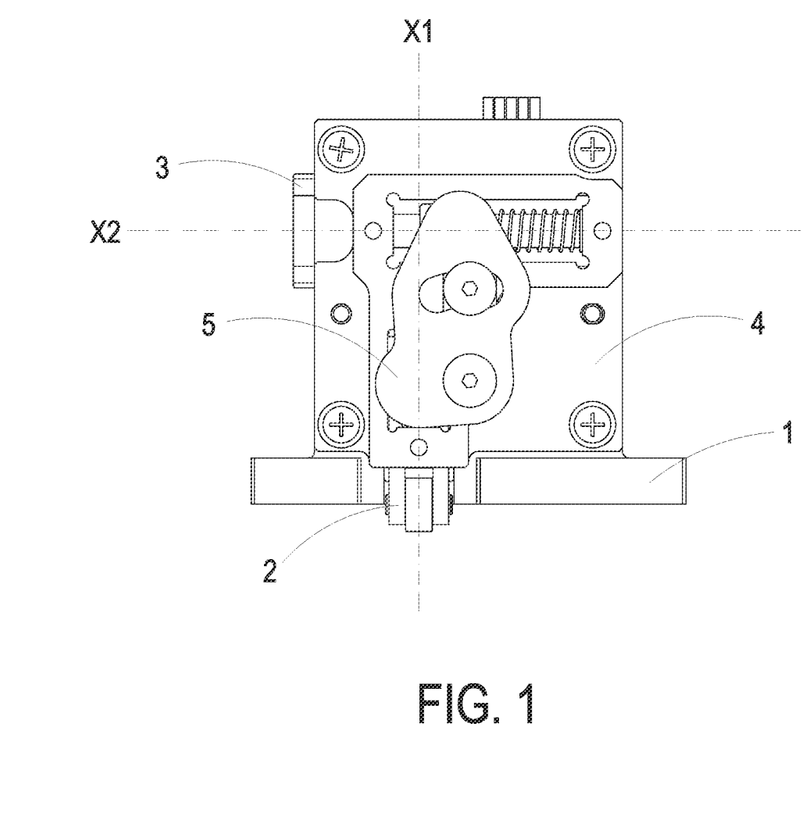
FIG. 1 is a front view illustrating a thickness measuring device according to a first embodiment of the present disclosure.
Figure 2:
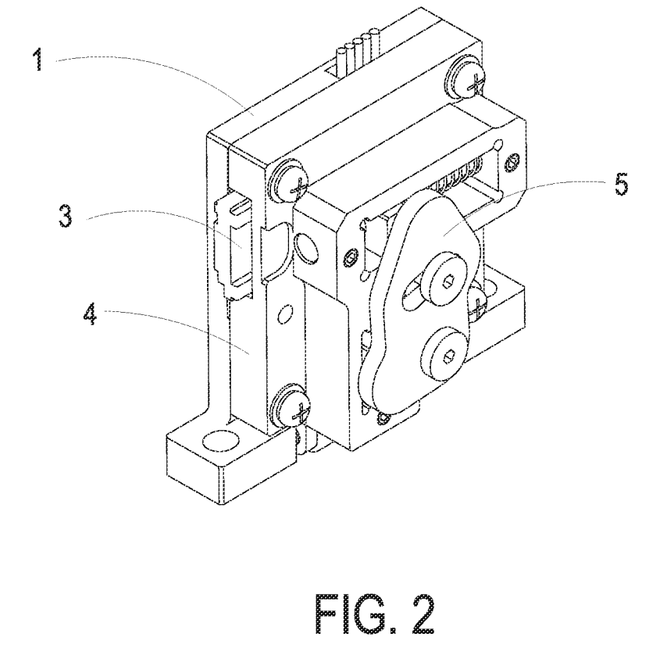
FIG. 2 is a schematic perspective view illustrating the thickness measuring device of FIG. 1.
Figure 3:
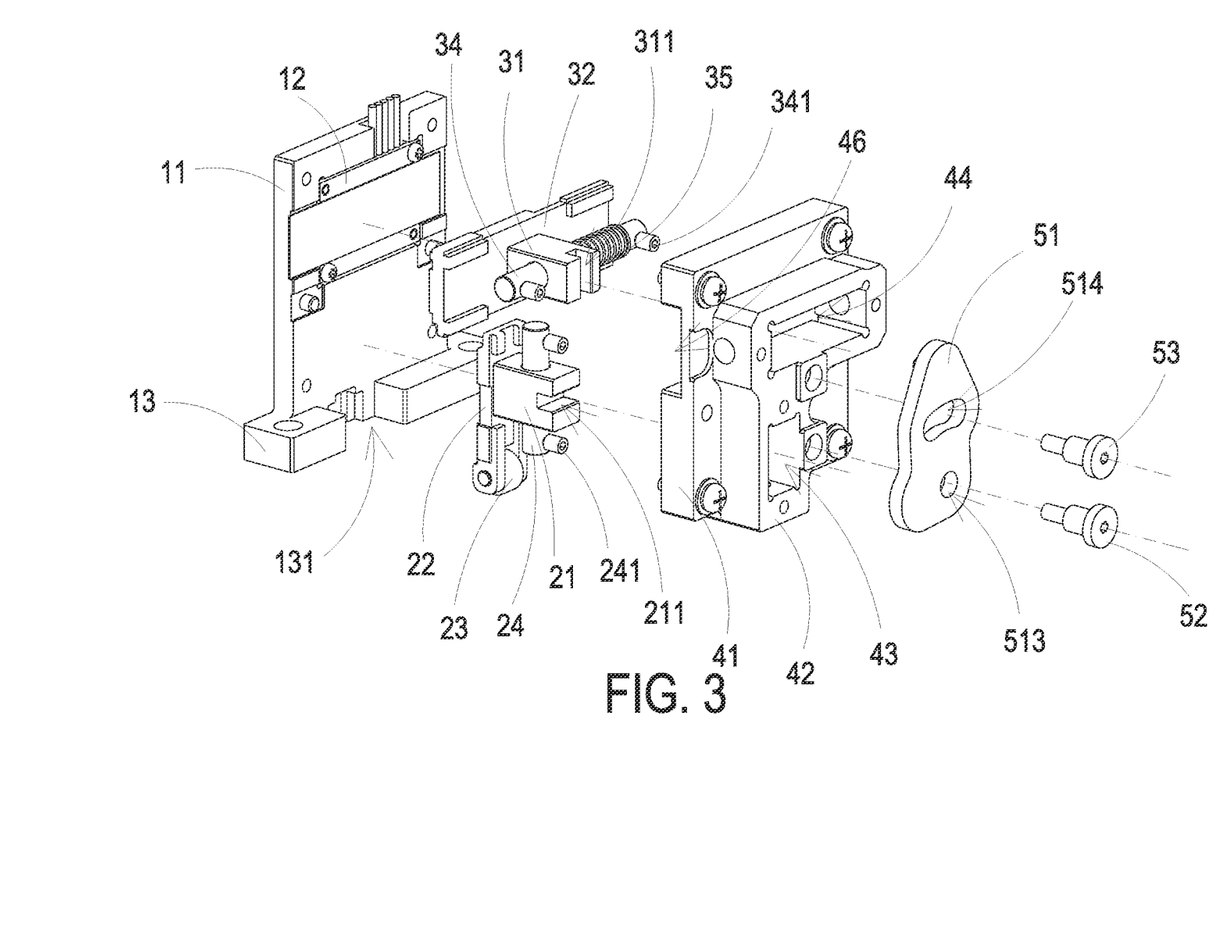
FIG. 3 is a schematic exploded view illustrating the thickness measuring device of FIG. 1 and taken from a perspective angle.
Figure 4:
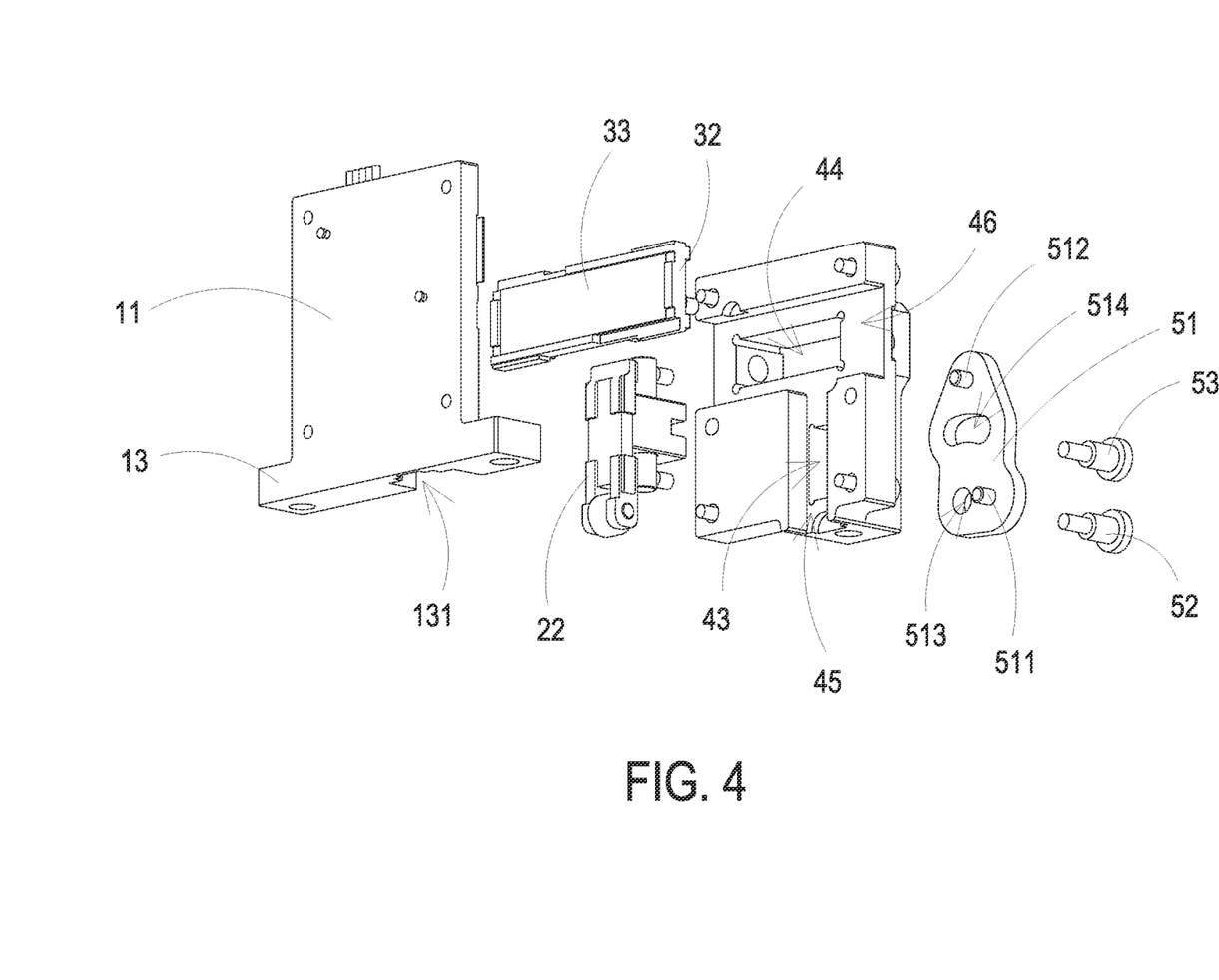
FIG. 4 is a schematic exploded view illustrating the thickness measuring device of FIG. 1 and taken from another perspective angle.

Please refer to FIGS. 1, 2, 3 and 4. FIG. 1 is a front view illustrating a thickness measuring device according to a first embodiment of the present disclosure. FIG. 2 is a schematic perspective view illustrating the thickness measuring device of FIG. 1. FIG. 3 is a schematic exploded view illustrating the thickness measuring device of FIG. 1 and taken from a perspective angle. FIG. 4 is a schematic exploded view illustrating the thickness measuring device of FIG. 1 and taken from another perspective angle. As shown in the figures, the thickness measuring device includes a base 1, a first moving component 2, a second moving component 3, a frame 4 and a linking component 5. The base 1 includes a base main body 11 and a sensor 12. The sensor 12 is disposed on a surface of the base main body 11. The first moving component 2 is capable of moving along a first direction X1 and includes a contacting end 23. The contacting end 23 is configured to contact a detected object, i.e., contact a laminating film. In this embodiment, the contacting end 23 is a scroll wheel, but not limited thereto. The second moving component 3 is capable of moving along a second direction X2 and includes a sensing element 33. The sensing element 33 is spatially corresponding to the sensor 12. In this embodiment, the sensor 12 is a capacitance-grating sensor, and the sensing element 33 is a fixed grating, but not limited thereto. The frame 4 is connected to the base 1 and includes a frame main body 41, a first guiding groove 45 and a second guiding groove 46. The first guiding groove 45 and the second guiding groove 46 are formed on the frame main body 41. The first moving component 2 is at least partially accommodated in the first guiding groove 45 and is capable of moving therein. The second moving component 3 is at least partially accommodated in the second guiding groove 46 and is capable of moving therein. The linking component 5 includes a rotating element 51, a first connection portion 511 and a second connection portion 512. The first connection portion 511 and the second connection portion 512 are disposed on the same surface of the rotating element 51. The first connection portion 511 is connected to the first moving component 2, and the second connection portion 512 is connected to the second moving component 3.

In this embodiment, the base 1 further includes a fixing base 13 and an opening 131. The fixing base 13 is disposed on an end of the base 1 and is configured to be connected to and fixed on a laminator. The opening 131 is disposed on the fixing base 13. The contacting end 23 of the first moving component 2 can pass through the opening 131 and contact the detected object.

In this embodiment, the first moving component 2 further includes a first block body 21 and a first sliding member 22. The first block body 21 is connected to the first sliding member 22. The first block body 21 includes a first recess 211. The contacting end 23 is disposed on an end of the first sliding member 22. The second moving component 3 further includes a second block body 31 and a second sliding member 32. The second block body 31 is connected to the second sliding member 32. The second block body 31 includes a second recess 311. The sensing element 33 is disposed on a bottom surface of the second sliding member 32 and is spatially corresponding to the sensor 12 of the base 1. The frame 4 further includes an extending portion 42, a first through hole 43 and a second through hole 44. The extending portion 42 is extended from the frame main body 41. The first through hole 43 and the second through hole 44 are formed on the extending portion 42. The first through hole 43 is in communication with the first guiding groove 45, and the second through hole 44 is in communication with the second guiding groove 46. The first block body 21 of the first moving component 2 is accommodated in the first through hole 43 of the frame 4, and the first sliding member 22 is accommodated in the first guiding groove 45. The second block body 31 of the second moving component 3 is accommodated in the second through hole 44 of the frame 4, and the second sliding member 32 is accommodated in the second guiding groove 46. The first connection portion 511 of the rotating element 51 is partially accommodated in and fastened to the first recess 211 of the first block body 21, and the second connection portion 512 is partially accommodated in and fastened to the second recess 311 of the second block body 31. Thereby, the first moving component 2, the rotating element 51 and the second moving component 3 are connected to and linked to each other.

In this embodiment, the linking component 5 includes a first fixing element 52 and a second fixing element 53. The rotating element 51 further includes a first perforation 513 and a second perforation 514. The first perforation 513 and the second perforation 514 are formed on the rotating element 51. The first perforation 513 is substantially in circle, and the second perforation 514 has an arc profile. The first fixing element 52 penetrates the first perforation 513 and is connected to the extending portion 42 of the frame 4. The second fixing element 53 penetrates the second perforation 514 and is connected to the extending portion 42 of the frame 4. The rotating element 51 is capable of rotating with the first fixing element 52 as a rotating axis. A distance between the first connection portion 511 and the first fixing element 52 is shorter than a distance between the second connection portion 512 and the first fixing element 52. The arc profile of the second perforation 514 is designed according to the rotation of the rotating element 51, so that the second fixing element 53 can move along the second perforation 514 with respect to the rotating element 51 during the rotation of the rotating element 51. In this embodiment, the first fixing element 52 and the second fixing element 53 can be connected to and fixed on the extending portion 42 by screws, embedding or fastening, but not limited thereto. It should be noted that in this embodiment, the second fixing element 53 and the second perforation 514 are configured to avoid the separation of the rotating element 51 and the extending portion 42 of the frame 4 during the rotation of the rotating element 51, so as to improve the rotation stability of the rotating element 51, but not limited thereto. In some embodiments, the linking component 5 does not include the second fixing element 53, and the rotating element 51 omits the second perforation 514. Thereby, when the contacting end 23 of the first moving component 2 contacts the detected object and then moves along the first direction X1, the first moving component 2 drives the first connection portion 511 to move along the first direction X1, and drives the rotating element 51 to rotate with first fixing element 52 as the rotating axis. Owing to the rotation of the rotating element 51, the second connection portion 512 of the rotating element 51 drives the second moving component 3 to move along the second direction X2. By sensing the displacement of the sensing element 33 of the second moving component 3 by the sensor 12 of the base 1, the displacement of the contacting end 23 can be acquired through the calculation. That is, the thickness of the laminating film can be obtained. In addition, since the distance between the second connection portion 512 and the rotating axis of the rotating element 51 is longer than the distance between the first connection portion 511 and the rotating axis of the rotating element 51, the displacement of the second moving component 3 is greater than the displacement of the first moving component 2. Consequently, the efficacy of amplifying the sensing signal to improve the measurement accuracy is achieved.

Figure 5:
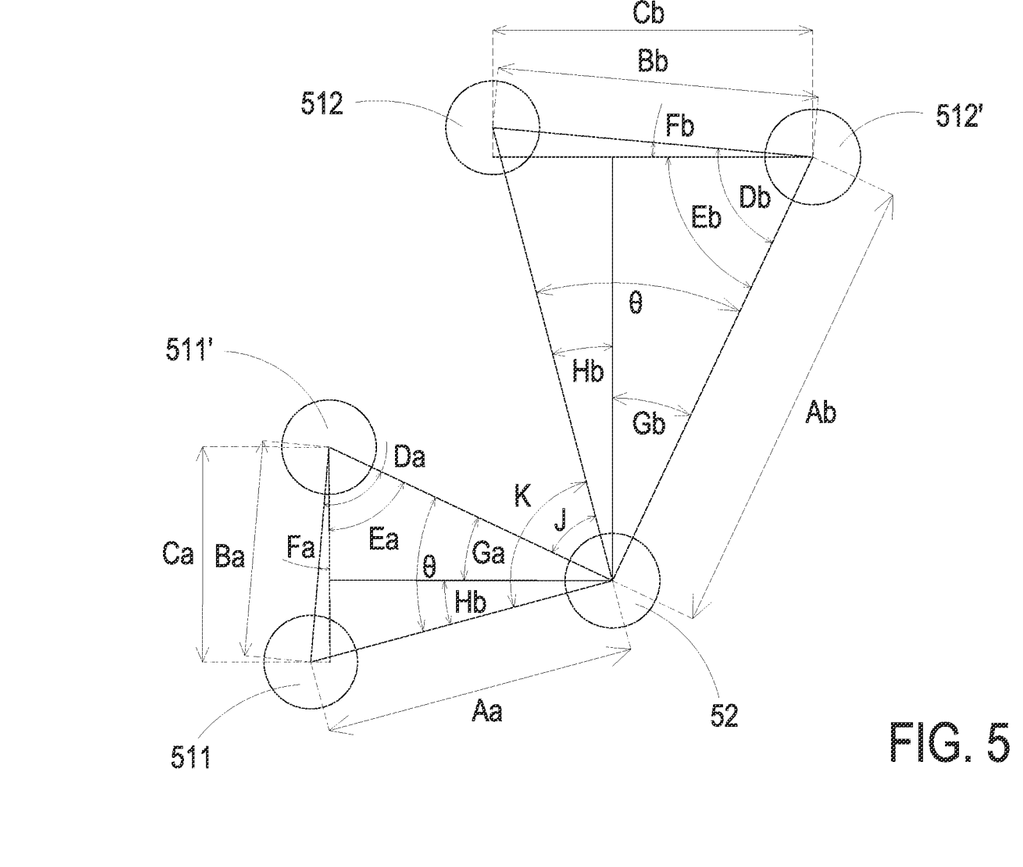
FIG. 5 is a schematic view illustrating the linking relationship between a first moving component, a linking component and a second moving component of the thickness measuring device of FIG. 1.

Please refer to FIGS. 1 and 5. FIG. 5 is a schematic view illustrating the linking relationship between a first moving component, a linking component and a second moving component of the thickness measuring device of FIG. 1. A relationship formula of the displacement of the second moving component 3 on the second direction X2 and the displacement of the first moving component 2 on the first direction X1 can be obtained through the calculation formulas as follows, first:

$$Hb° + J° = K° - Gb°;\ Hb° + J° + Ga° = 90°;\ K° - Gb° + Ga° = 90°;$$

$$Gb° = K° + Ga° - 90°;$$

-continued $$Eb° + Gb° = 90° = Ga° + Ea°;$$

$$Eb° + K° + Ga° - 90° = Ga° + Ea°;$$

$$Eb° + K° - 90° = Ea°.$$

$$2 \times Da° + \theta° = 180° = 2 \times Db° + \theta°; Da° = Db°.$$

$$Eb° + Fb° = Db° = Da° = Ea° + Fa° = Eb° + K° - 90° + Fa°;$$

According to the above relationships, it can be known that:

$$Fb° = K° - 90° + Fa°$$

Thereafter, the moving distance of the first moving component 2 and the moving distance of the second moving component 3 are calculated, respectively:

$$Ca = \frac{Ba = 2 \times Aa \times \sin\left(\frac{\theta}{2}\right);}{Ba \times \cos(Fa°) = 2 \times Aa \times \sin\left(\frac{\theta}{2}\right) \times \cos(Fa°) \circ Bb = 2 \times Ab \times \sin\left(\frac{\theta}{2}\right);}$$

$$Cb = Bb \times \cos(Fb°) =$$

$$2 \times Ab \times \sin\left(\frac{\theta}{2}\right) \times \cos(Fb°) = 2 \times Ab \times \sin\left(\frac{\theta}{2}\right) \times \cos(K° - 90° + Fa°) \circ$$

Finally, the relationship formula is obtained:

$$\frac{Cb}{Ca} = \frac{2 \times Ab \times \sin\left(\frac{\theta}{2}\right) \times \cos(K° - 90° + Fa°)}{\left[2 \times Aa \times \sin\left(\frac{\theta}{2}\right) \times \cos(Fa°)\right]} = \frac{Ab \times \cos(K° - 90° + Fa°)}{[Aa \times \cos(Fa°)]}$$

Wherein the angles Da, Db, Ea, Eb, Fa, Fb, Ga, Gb, Hb are the included angles as shown in the FIG. 5; the rotation angle θ is the angle that the first moving component 2 drives the rotating element 51 to rotate; the included angle K is defined by the line connecting the first connection portion 511 and the first fixing element 52 and the line connecting the second connection portion 512 and the first fixing element 52; the first radius Aa is equal to the distance between the first connection portion 511 and the first fixing element 52; the second radius Ab is equal to the distance between the second connection portion 512 and the first fixing element 52; the first moving distance Ba is the moving distance of the first connection portion 511 when the rotating element 51 rotates; the second moving distance Bb is the moving distance of the second connection portion 512 when the rotating element 51 rotates; the first displacement Ca is the displacement of the first moving component 2 on the first direction X1 when the rotating element 51 rotates; the second displacement Cb is the displacement of the second moving component 3 on the second direction X2 when the rotating element 51 rotates.

In this embodiment, since the first moving component 2 and the second moving component 3 are connected to the linking component 5, the moving tracks of the first moving component 2 and the second moving component 3 are actually arcs, which's lengths can be represented by the first moving distance Ba and the second moving distance Bb, substantially. It should be noted that the structure of the frame 4 allows the arc-shape movements of the first moving component 2 and the second moving component 3.

By the relationship formula mentioned above, the first displacement Ca can be calculated from the second displacement Cb. That is, by sensing the displacement of the sensing element 33 of the second moving component 3 on the second direction X2, the thickness of the detected object can be calculated. It should be noted that when the included angle K is equal to 90 degrees, the ratio of the second displacement Cb and the first displacement Ca is equal to the ratio of the second radius Ab and the first radius Aa. Therefore, in this embodiment, the included angle K is preferably equal to 90 degrees, but not limited thereto. In some embodiments, the included angle K is in a range between 45 degrees and 135 degrees. In this embodiment, the rotation angle θ of the rotating element 51 is in a range between 1 degree and 45 degrees, and the first direction X1 and the second direction X2 are perpendicular to each other, but not limited thereto.

In this embodiment, the first moving component 2 further includes a first guiding rod 24, and the second moving component 3 further includes a second guiding rod 34. The first guiding rod 24 penetrates the first block body 21, and two ends of the first guiding rod 24 are connected to and fixed on two sidewalls within the first through hole 43. The second guiding rod 34 penetrates the second block body 31, and two ends of the second guiding rod 34 are connected to and fixed on two sidewalls within the second through hole 44. In this embodiment, the extended direction of the first guiding rod 24 is parallel to the first direction X1, and the first guiding rod 24 is connected to the two sidewalls within the first through hole 43 for example but not limited by penetrating, fastening, gluing or abutting. Thereby, the first block body 21 is capable of moving along the first guiding rod 24. The extended direction of the second guiding rod 34 is parallel to the second direction X2, and the second guiding rod 34 is connected to the two sidewalls within the second through hole 44 for example but not limited by penetrating, fastening, gluing or abutting. Thereby, the second block body 31 is capable of moving along the second guiding rod 34. In this embodiment, the first guiding rod 24 further includes two first protruding portions 241, and the second guiding rod 34 further includes two second protruding portions 341. The two first protruding portions 241 are disposed on two ends of the first guiding rod 24, and are connected to and fixed on the extending portion 42 of the frame 4. The two second protruding portions 341 are disposed on two ends of the second guiding rod 34, and are connected to and fixed on the extending portion 42 of the frame 4. In this embodiment, the first protruding portions 241 and the second protruding portions 341 can be connected to and fixed on the extending portion 42 by fastening, embedding or screws, but not limited thereto. By the first guiding rod 24, the second guiding rod 34, the first protruding portions 241 and the second protruding portions 341, the first moving component 2 and the second moving component 3 move more stably, and the measurement accuracy is further improved.

In this embodiment, the second moving component 3 further includes an elastic element 35. The elastic element 35 is disposed around the second guiding rod 34 and is abutted between the second block body 31 and the sidewall within the second through hole 44. Thereby, the resetting function of the first moving component 2, the rotating element 51 and the second moving component 3 is achieved.

Figure 6:
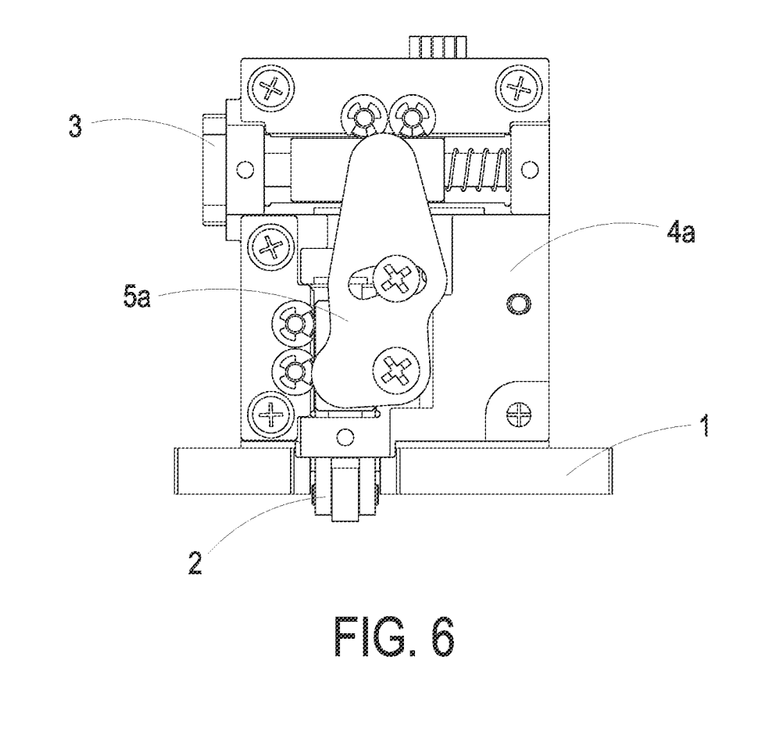
FIG. 6 is a front view illustrating a thickness measuring device according to a second embodiment of the present disclosure.
Figure 7:
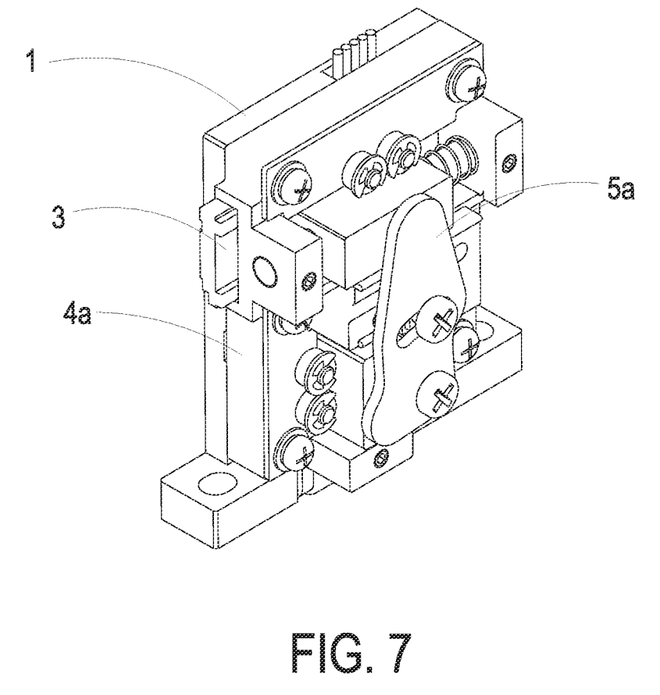
FIG. 7 is a schematic perspective view illustrating the thickness measuring device of FIG. 6.
Figure 8:
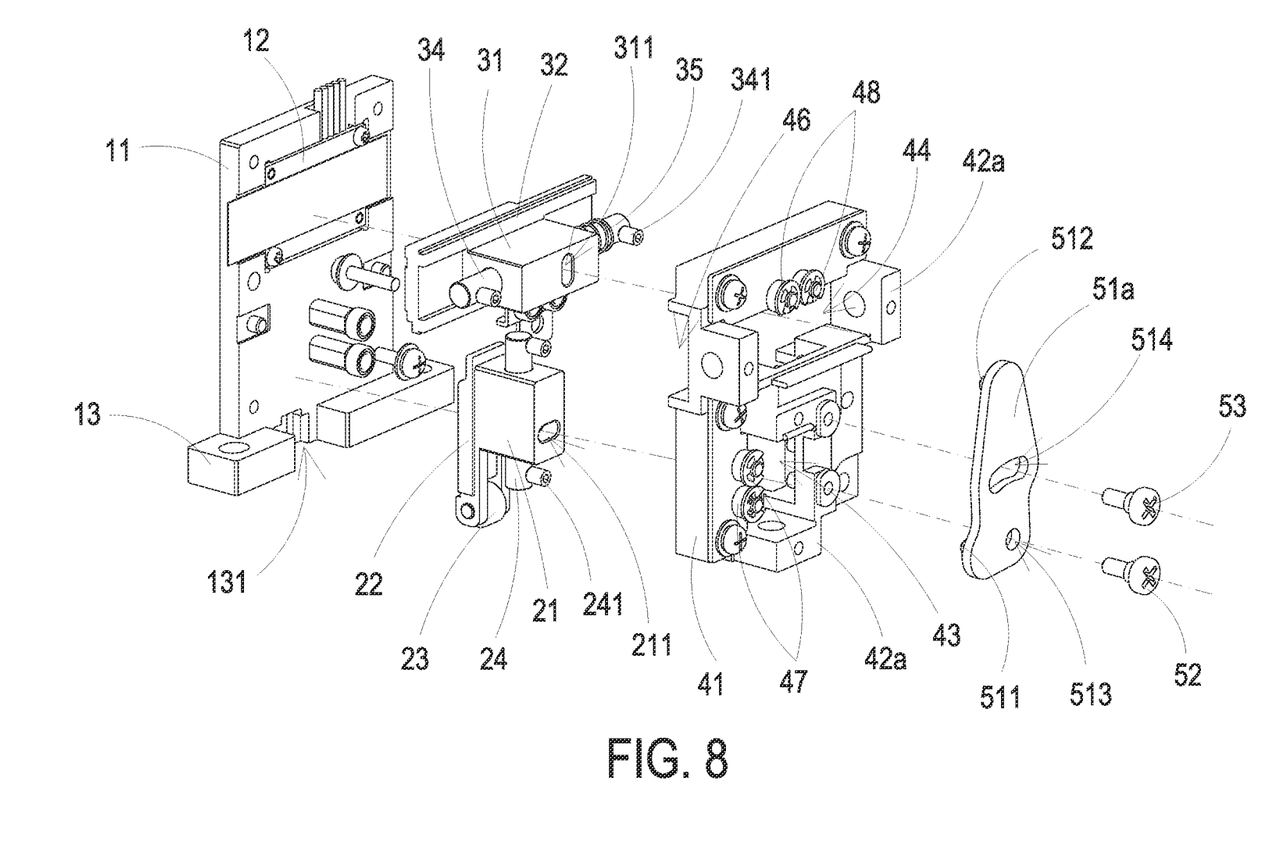
FIG. 8 is a schematic exploded view illustrating the thickness measuring device of FIG. 6 and taken from a perspective angle.

Please refer to FIGS. 6, 7 and 8. FIG. 6 is a front view illustrating a thickness measuring device according to a second embodiment of the present disclosure. FIG. 7 is a schematic perspective view illustrating the thickness measuring device of FIG. 6. FIG. 8 is a schematic exploded view illustrating the thickness measuring device of FIG. 6 and taken from a perspective angle. In this embodiment, the profile of the rotating element 51a of the linking component 5a is narrower and longer than the rotating element 51 in the first embodiment, and the frame 4a further includes at least one first bearing 47 and at least one second bearing 48. The first bearing 47 and the second bearing 48 are disposed on the frame main body 41. The first bearing 47 contacts the first moving component 2, and the second bearing 48 contacts the second moving component 3. In this embodiment, the frame 4a includes two sets of the first bearings 47 and two sets of the second bearings 48. The first bearings 47 are closely adjacent to a side of the first block body 21 of the first moving component 2, and the second bearings 48 are closely adjacent to a side of the second block body 31 of the second moving component 3. Thereby, the frictions between the first moving component 2 and the frame 4 and between the second moving component 3 and the frame 4 result from the movements of the first moving component 2 and the second moving component 3 are reduced, and the smoothness of the movement is improved. Consequently, the measurement accuracy is further improved.

In the first and the second embodiments of the present disclosure, the rotating element 51 is a plate. It should be noted that the first moving component 2 and the second moving component 3 are linked through the single element, i.e., the linking component 5. Not only the efficacy of amplifying the sensing signal can be achieved, the thickness measuring device can also have a simpler structure than prior arts. Consequently, it benefits to simplify the assembling process and reduce the manufacturing cost of the thickness measuring device.

From the above descriptions, the present disclosure provides a thickness measuring device. By the difference between the distance between the first moving component and the rotating axis of the linking component and the distance between the second moving component and the rotating axis of the linking component, the displacement of the second moving component is greater than the displacement of the first moving component, thereby achieving the efficacy of amplifying the sensing signal. In addition, the structures of the first moving component and the second moving component benefit to move stably, and the bearings are optionally disposed, both of which improve the measurement accuracy further. Furthermore, by the structural design of the rotating element, the efficacies of simplifying the assembling process and reducing the manufacturing cost of the thickness measuring device are achieved.

While the disclosure has been described in terms of what is presently considered to be the most practical and preferred embodiments, it is to be understood that the disclosure needs not be limited to the disclosed embodiment.

What is claimed is:

1. A thickness measuring device, comprising:
a base comprising a base main body and a sensor, wherein the sensor is disposed on a surface of the base main body;
a first moving component capable of moving along a first direction and comprising a contacting end, wherein the contacting end is configured to contact a detected object;
a second moving component capable of moving along a second direction and comprising a sensing element, wherein the sensing element is spatially corresponding to the sensor;
a frame connected to the base and comprising a frame main body, a first guiding groove and a second guiding groove, wherein the first guiding groove and the second guiding groove are formed on the frame main body, the first moving component is at least partially accommodated in the first guiding groove and is capable of moving in the first guiding groove, and the second moving component is at least partially accommodated in the second guiding groove and is capable of moving in the second guiding groove; and
a linking component comprising a rotating element, a first connection portion and a second connection portion, wherein the first connection portion is disposed on a surface of the rotating element and is connected to the first moving component, and the second connection portion is disposed on the surface of the rotating element and is connected to the second moving component.

2. The thickness measuring device according to claim 1, wherein the first moving component further comprises a first block body and a first sliding member, the first block body is connected to the first sliding member, and the contracting end is disposed on an end of the first sliding member, wherein the second moving component further comprises a second block body and a second sliding member, the second block body is connected to the second sliding member, and the sensing element is disposed on a bottom surface of the second sliding member, wherein the frame further comprises an extending portion, a first through hole and a second through hole, the extending portion is extended from the frame main body, the first through hole and the second through hole are formed on the extending portion, wherein the first through hole is in communication with the first guiding groove, and the second through hole is in communication with the second guiding groove, wherein the first block body of the first moving component is accommodated in the first through hole of the frame, the first sliding member is accommodated in the first guiding groove, the second block body of the second moving component is accommodated in the second through hole of the frame, and the second sliding member is accommodated in the second guiding groove.

3. The thickness measuring device according to claim 2, wherein the first block body of the first moving component comprises a first recess, and the second block body of the second moving component comprises a second recess, wherein the first connection portion of the rotating element is partially accommodated in the first recess, and the second connection portion of the rotating element is partially accommodated in the second recess.

4. The thickness measuring device according to claim 2, wherein the linking component comprises a first fixing element, and the rotating element further comprises a first perforation, wherein the first perforation is formed on the rotating element, and the first fixing element penetrates the first perforation and is connected to the extending portion of the frame, wherein the rotating element rotates with the first fixing element as an rotating axis, and a distance between the first connection portion and the first fixing element is shorter than a distance between the second connection portion and the first fixing element.

5. The thickness measuring device according to claim 4, wherein the linking component further comprises a second fixing element, and the rotating element further comprises a second perforation, wherein the second perforation is formed on the rotating element and has an arc profile, and the second fixing element penetrates the second perforation and is connected to the extending portion of the frame, wherein when the rotating element rotates, the second fixing element moves along the second perforation with respect to the rotating element.

6. The thickness measuring device according to claim 4, wherein an included angle is defined by a line connecting the first connection portion and the first fixing element and a line connecting the second connection portion and the first fixing element, and the included angle is in a range between 45 degrees and 135 degrees.

7. The thickness measuring device according to claim 2, wherein the second moving component further comprises an elastic element, and the elastic element is abutted between the second block body and one of two sidewalls within the second through hole.

8. The thickness measuring device according to claim 2, wherein the first moving component further comprises a first guiding rod, and the second moving component further comprises a second guiding rod, wherein the first guiding rod penetrates the first block body, and two ends of the first guiding rod are connected to and fixed on two sidewalls within the first through hole, wherein the second guiding rod penetrates the second block body, and two ends of the second guiding rod are connected to and fixed on two sidewalls within the second through hole.

9. The thickness measuring device according to claim 8, wherein the first guiding rod further comprises two first protruding portions, and the second guiding rod further comprises two second protruding portions, wherein the two first protruding portions are disposed on the two ends of the first guiding rod, and are connected to and fixed on the extending portion of the frame, wherein the two second protruding portions are disposed on the two ends of the second guiding rod, and are connected to and fixed on the extending portion of the frame.

10. The thickness measuring device according to claim 1, wherein the base further comprises a fixing base and an opening, the fixing base is disposed on an end of the base, the opening is disposed on the fixing base, and the contacting end of the first moving component passes through the opening to contact the detected object.

11. The thickness measuring device according to claim 1, wherein the frame further comprises at least one first bearing and at least one second bearing disposed on the frame main body, wherein the at least one first bearing contacts the first moving component, and the at least one second bearing contacts the second moving component.

12. The thickness measuring device according to claim 1, wherein the first direction and the second direction are perpendicular to each other.

13. The thickness measuring device according to claim 1, wherein the sensor is a capacitance-grating sensor, and the sensing element is a fixed grating.

* * * * *